United States Patent
Tillner

(10) Patent No.: US 8,193,452 B2
(45) Date of Patent: Jun. 5, 2012

(54) ELECTRICAL CABLE AND MANUFACTURING METHOD THEREOF

(75) Inventor: Siegbert Tillner, Erndtebrück (DE)

(73) Assignee: Nexans, Paris (FR)

( * ) Notice: Subject to any disclaimer, the term of this patent is extended or adjusted under 35 U.S.C. 154(b) by 447 days.

(21) Appl. No.: 12/286,899

(22) Filed: Oct. 2, 2008

(65) Prior Publication Data

US 2009/0114423 A1    May 7, 2009

(30) Foreign Application Priority Data

Oct. 4, 2007  (EP) .................................... 07291209

(51) Int. Cl.
*H01B 7/08*  (2006.01)
(52) U.S. Cl. ................................. 174/117 FF
(58) Field of Classification Search ........... 174/34, 174/117 FF; 310/213
See application file for complete search history.

(56) References Cited

U.S. PATENT DOCUMENTS

| 3,118,015 | A  | * | 1/1964  | Willyoung ................... 174/33 |
| 3,614,497 | A  | * | 10/1971 | Brenner ..................... 310/213 |
| 4,384,227 | A  |   | 5/1983  | Kawai |
| 4,959,575 | A  | * | 9/1990  | Saitoh et al. ............... 310/213 |
| 5,270,598 | A  |   | 12/1993 | Holly, III et al. |
| 6,603,234 | B2 | * | 8/2003  | Heyden et al. ............. 310/194 |
| 2004/0245009 | A1 |   | 12/2004 | Grogl et al. |

FOREIGN PATENT DOCUMENTS

EP  1079500  2/2001

* cited by examiner

*Primary Examiner* — Chau Nguyen
(74) *Attorney, Agent, or Firm* — Sofer & Haroun, LLP

(57) ABSTRACT

An electrical transposed conductor is specified, which comprises two stacks (8, 9), which are located alongside one another, each comprising a plurality of flat electrical conductor elements (7) which are arranged one above the other, are isolated from one another and have a rectangular cross section. Over the entire length of the transposed conductor continuing without interruption, conductor elements of a first stack are passed by bending into the other stack and, after a predetermined distance, are passed back again into the first stack. The conductor elements (7) run in a straight line at least one of their ends over a length (L) which is adequate for simple processing.

2 Claims, 1 Drawing Sheet

ELECTRICAL CABLE AND MANUFACTURING METHOD THEREOF

RELATED APPLICATIONS

The present application claims the benefit of priority from European Patent Application No. 07291209.0, filed on Oct. 4, 2007

FIELD OF THE INVENTION

DESCRIPTION

The invention relates to an electrical transposed conductor, comprising two stacks, which are located alongside one another, each comprising a plurality of flat electrical conductor elements which are arranged one above the other, are isolated from one another and have a rectangular cross section, in which, over its entire length continuing without interruption, conductor elements of a first stack are passed by bending into the other stack and, after a predetermined distance, are passed back again into the first stack (EP 1 079 500 A1).

BACKGROUND OF THE INVENTION

Transposed conductors such as these, which are known from EP 1 079 500 A1, are required to produce windings for electrical appliances, such as and in particular transformers. They are manufactured with a great length of, for example, 5000 m, and are wound up onto spools in the manufacturer's works. At the installation location, the transposed conductor is unwound from the spool and is processed to form a winding. In order to keep electrical and magnetic influences on the transposed conductor as small as possible in the case of an electrically active winding, the positions of the conductor elements are interchanged continuously, without any interruption, in the overall cross section over the entire length of the transposed conductor, during its production, in that the conductor element which is located at the top in one stack and the conductor element which is located at the bottom in the other stack are in each case passed into the respective other stack. The winding which is manufactured from the transposed conductor is electrically conductively connected to other parts of the installation location. For this purpose, the conductor elements must be detached from their stack structure at their ends, and must be prepared for further processing. In this case, the conductor elements are also electrically conductively connected to one another, to form a conductor. Once the processing has been completed, the conductor elements must be moved back to their position in the stacks of the transposed conductor.

OBJECTS AND SUMMARY OF THE INVENTION

The invention is based on the object of designing the transposed conductor as described initially such that the end of a winding manufactured therefrom can be processed in a simple manner.

According to the invention, this object is achieved in that the conductor elements run in a straight line without a bend, at least at one of their ends, over a length which is sufficient for processing, preferably for making electrical contact.

This transposed conductor is designed such that electrical contact can be made with a winding produced from it, in a very simple manner. All that is required to do this is to strip the insulation from the ends of the conductor elements, which run in a straight line, and to electrically conductively connect them to one another to form a conductor. In principle, this can be carried out completely automatically. The conductor elements, which run in a straight line, can be placed together in their position in the stacks of the transposed conductor, after they have been processed, without any problems. The transposed conductor, which is in the form of a uniform conductor, can be provided with electrical connections in a conventional manner, or electrical contact can be made with it in any desired manner. There is no need to work on the winding itself for any of the corresponding processes. The conductor elements remain in their position in the winding, without any change.

At least at one end of the transposed conductor, the conductor elements run in a straight line. If electrical parts to be connected are configured appropriately, it may be possible to dispense with the straight-line profile at the other end thereof.

The straight-line area of the conductor elements advantageously has a minimum length of 0.20 m. If required, it may also have a length of up to 2.00 m.

BRIEF DESCRIPTION OF THE DRAWINGS

One exemplary embodiment of the subject matter according to the invention is illustrated in the drawings, in which.

DETAILED DESCRIPTION

Figure 1:
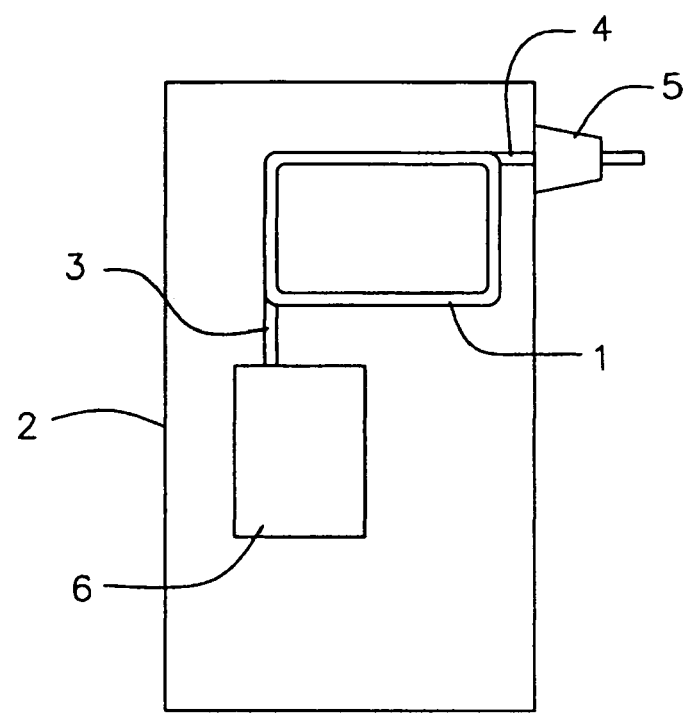
FIG. 1 shows a schematic illustration of an electrical appliance having a winding manufactured from a transposed conductor.
Figure 2:
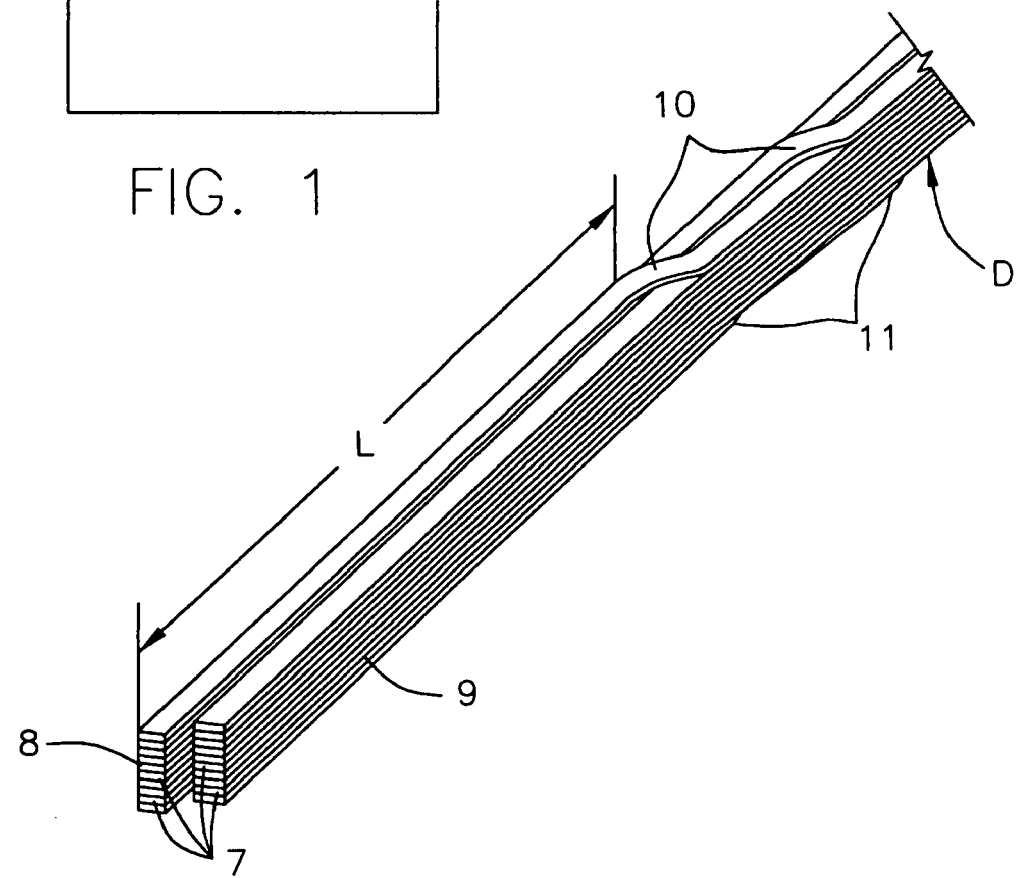
FIG. 2 shows the end of a transposed conductor according to the invention.

A transposed conductor D whose end is illustrated in FIG. 2 is processed to form an electrical turn 1 which, for example, is arranged in a transformer 2. The winding 1 has two ends 3 and 4 at which the transposed conductor D is electrically conductively connected to other parts. By way of example, this may be a bushing 5 at one end and a contact unit 6 at the other end.

The transposed conductor D comprises flat electrical conductor elements 7 which are isolated from one another, have a rectangular cross section, and are arranged alongside one another in two stacks 8 and 9. By way of example, they are composed of copper or aluminium. During the production of the transposed conductor D, the positions of the partial conductors 7 are changed continuously, without interruption from stack 8 to stack 9 on the one hand, and from stack 9 to stack 8 on the other hand. For this purpose, the conductor element 7 which is in each case located at the top of the first stack, in this case the stack 8, is bent at the appropriate location-changing points 10 such that it comes to rest at the top on the second stack, in this case the stack 9. At the same time, the conductor element 7 which is in each case located at the bottom of the second stack is bent at the position-changing points 11 such that it assumes the lower position in the first stack.

In the transposed conductor D according to the invention, the ends of the conductor elements 7 run in a straight line at least one end thereof, to be precise over a length L which is preferably between 0.20 m and 2.00 m. In the region of the length L, the transposed conductor D therefore has no position-changing points or bends, as a result of which its conductor elements can be processed particularly easily, as described above, and can be moved back into their positions in the stacks of the transposed conductor.

The invention claimed is:

1. An electrical transposed conductor for the production of electrical transformers, comprising:

two stacks, which are located alongside one another, each having a plurality of flat electrical conductor elements which are arranged one above the other, are isolated from one another and have a rectangular cross section, in which, over its entire length continuing without interruption, the conductor elements of a first stack are passed by bending into the other stack and, after a predetermined distance, are passed back again into the first stack, said transposed conductor being a uniform conductor wherein the conductor elements run in a straight line without a bend and have no position changing points, at least at one of their ends, over a length of at least 0.20 m and as a result of which the conductor elements can be processed easily and can be moved back into their positions in the stacks of the transposed conductor.

2. Transposed conductor according to Claim wherein the conductor elements run in a straight line at both ends of the transposed conductor.

* * * * *